United States Patent
Blanc (10) Patent No.: US 7,259,474 B2
(45) Date of Patent: Aug. 21, 2007

(54) METHOD AND APPARATUS FOR AGGREGATING POWER FROM MULTIPLE SOURCES

(75) Inventor: James Joseph Blanc, San Mateo, CA (US)

(73) Assignee: UTStarcom, Inc., Alameda, CA (US)

( * ) Notice: Subject to any disclaimer, the term of this patent is extended or adjusted under 35 U.S.C. 154(b) by 405 days.

(21) Appl. No.: 10/410,380

(22) Filed: Apr. 9, 2003

(65) Prior Publication Data

US 2004/0201933 A1    Oct. 14, 2004

(51) Int. Cl.
H02J 3/38    (2006.01)
H02J 1/10    (2006.01)
H02J 3/06    (2006.01)

(52) U.S. Cl. .......................... 307/45; 307/19

(58) Field of Classification Search .................. 307/19, 307/45
See application file for complete search history.

(56) References Cited

U.S. PATENT DOCUMENTS

| | | | | |
|---|---|---|---|---|
| 4,174,534 A | * | 11/1979 | Kotlarewsky | 363/26 |
| 4,393,492 A | | 7/1983 | Bishop | 370/15 |
| 4,730,311 A | | 3/1988 | Carse et al. | 370/110.1 |
| 4,734,844 A | * | 3/1988 | Rhoads | 363/72 |
| H001175 H | | 4/1993 | Giorgio | 370/118 |
| 5,260,937 A | | 11/1993 | Eames et al. | 370/68.1 |
| 5,390,239 A | | 2/1995 | Morris et al. | 379/93 |
| 5,757,634 A | * | 5/1998 | Ferens | 363/72 |
| 5,898,761 A | | 4/1999 | McHale et al. | 379/93.01 |
| 5,905,778 A | | 5/1999 | Shires | 379/93.01 |
| 5,923,671 A | | 7/1999 | Silverman | 370/542 |
| 6,005,873 A | | 12/1999 | Amit | 370/494 |
| 6,009,106 A | | 12/1999 | Rustad et al. | 370/523 |
| 6,014,431 A | | 1/2000 | McHale et al. | 379/93.14 |
| 6,061,392 A | | 5/2000 | Bremer et al. | 375/222 |
| 6,084,874 A | | 7/2000 | Nguyen et al. | 370/352 |
| 6,160,808 A | | 12/2000 | Maurya | 370/389 |
| 6,160,843 A | | 12/2000 | McHale et al. | 375/222 |

(Continued)

FOREIGN PATENT DOCUMENTS

JP    10-173811    *  6/1998

(Continued)

OTHER PUBLICATIONS

"X-Cel & GDSL System V.90 Rls@ Analog Modem Support," GoDigital Networks-Technical Note, 7 pages, Jan. 23, 2001.

(Continued)

Primary Examiner—Brian Sircus
Assistant Examiner—Hal I. Kaplan
(74) Attorney, Agent, or Firm—McDonnell Boehnen Hulbert & Berghoff LLP (57) ABSTRACT

A method and apparatus for aggregating power from multiple sources generates a single direct current regulated voltage. The apparatus comprises a plurality of slave voltage converters and a master pulse width modulator circuit. Providing a plurality of direct current power sources, current is drawn through a plurality of lines connected to the plurality of direct current power sources. An open circuit voltage for each direct current power source is unknown. Each line of the plurality of lines has a line resistance. The line resistance of at least some of the plurality of lines may be unknown. The line resistance of at least some of the plurality of lines is large. The single direct current regulated voltage is generated from the drawn current.

30 Claims, 5 Drawing Sheets

U.S. PATENT DOCUMENTS

| | | | |
|---|---|---|---|
| 6,169,788 B1 | 1/2001 | McHale et al. | 379/93.14 |
| 6,198,749 B1 | 3/2001 | Hui | 370/463 |
| 6,324,212 B1 | 11/2001 | Jenness | 375/222 |
| 6,349,123 B1 | 2/2002 | Kim | 375/480 |
| 6,373,852 B1 | 4/2002 | Foladare | 370/465 |
| 6,665,404 B2 * | 12/2003 | Cohen | 379/413 |
| 6,809,678 B2 * | 10/2004 | Vera et al. | 341/166 |
| 6,841,897 B2 * | 1/2005 | Priest | 307/52 |
| 6,992,404 B2 * | 1/2006 | Priest | 307/80 |
| 2004/0017848 A1 * | 1/2004 | Doan et al. | 375/222 |

FOREIGN PATENT DOCUMENTS

WO        WO99/20033        4/1999

OTHER PUBLICATIONS

"Connection Optimized Link Technology," White paper, Ramp Networks, 6 pages, (1998).

"Powerful Internet and Remote Access Platform," WebRamp 361i, 2 pages, Mar. 2000.

"Dualing Modems Reach 112K," Wired News, 3 pages, Feb. 3, 2000.

"SupraSonic Dual Modem: Twice is Nice," PCWorld.com, 3 pages, Jul. 27, 1998.

"Copper Edge 200 RT DSL Concentrator," 4 pages, Aug. 2001.

"Multi-Tenant Unit Profitability Analysis," 10 pages, Dec. 2000.

\* cited by examiner

METHOD AND APPARATUS FOR AGGREGATING POWER FROM MULTIPLE SOURCES

BACKGROUND

When powering an electronic system, close attention must be paid to the power source or sources and how best to deliver power from the power sources to the electronic system. Almost all power sources have a limited capacity to supply power to a load. A power source has limitations determined by its generator and a transmission line connecting the generator to the load, or electronic system.

Typically, an electronic system is designed having a power specification. A power system is designed that meets the needs of the power specification of the system. In designing the power system, the transmission line between the load and the generator is sized such that power is transferred with an acceptable level of loss and that sufficient power reaches the load. The generator is specified to be capable of supplying the load power plus the transmission line losses.

In the case of telecommunication systems, such as the public switched telephone network (PSTN), there exists a network of wires that can serve as transmission lines to supply power for remotely located electronic systems. Typically, a single power source is used to supply power over a single pair of wires to one or more loads. The remotely located electronic system is commonly referred to as being "span-powered" since direct current (DC) power as well as telephony signals are fed over the pair of wires. Signal repeaters are often employed along the length of the wire pair to maintain power and signal integrity. If the electronic system requires more power than can be provided, even at 100% efficiency, then it becomes necessary to replace the power source with one having a greater capacity. Replacing the power source can be extremely expensive. In some cases it may not be possible to replace the power source.

One piece of telecommunication equipment being used with increasing frequency is digital subscriber line access multiplexers (DSLAMs). DSLAMs make possible high speed data communications, such as the various types of digital subscriber lines (xDSL) communications, to a subscriber such as a home or business computer user. Because of the high power requirements of DSLAMs, they are placed in a central office (CO) or other environment where power is readily and abundantly available. Due to this placement requirement, which is dictated by the power requirements of the DSLAM, an estimated 40 to 80 million people in North America are unable to receive xDSL service. Many of those unable to receive xDSL service would be able to do so if the DSLAM could be remotely located, and remotely powered. However, there is currently no way to meet the power requirements of a DSLAM or other similar piece of equipment placed in a remote location.

One method used in some systems to deliver higher current, and to increase reliability of the power system, uses parallel power converters. Typically, multiple power converters are connected to a single power source with each power converter supplying current to the load by connecting the outputs of each power converter together, also known as power OR'ing. Reliability is increased since if one power converter fails, there are redundant parallel power converters that continue to supply power to the load. Power OR'ing is frequently used in computer systems to supply power to a microprocessor. In such systems there is one power source and the transmission lines from the power source to the power system have no significant resistance, and therefore do not contribute to any significant power loss.

Another method commonly implemented aggregates power from multiple DC power sources such as solar cells. Typically, DC current from multiple solar panels is converted to alternating current (AC) power through the use of multiple inverters. Multiple inverters are synchronized with each other, and with the AC power grid, to combine the outputs of multiple solar panels. The AC power grid aggregates, transmits, and distributes large amounts of power in the form of alternating current. Although the solar cells have power limitations, as in the case of power OR'ing above, the transmission lines from the power sources, that is the solar cells, to the power system have a very small resistance. Furthermore, the output voltage of the solar cells is generally known and is substantially equal from cell to cell. Additionally, the AC power grid is so much greater than the solar system's output in terms of its power capability that reliability and power delivery to the loads is dependent on the grid rather than the DC power sources, or solar cells, which merely contribute energy to the grid.

The methods described above are not applicable to solving the problem of powering a remotely located DSLAM as described above. A single wire pair of the PSTN cannot supply the power required by the DSLAM. Additionally, due in part to the characteristics of the generators and transmission lines of the PSTN, the methods described above that make use of multiple power converters connected to multiple wire pairs will not produce the stable, regulated DC power needed by a DSLAM.

In the PSTN, the characteristics of the transmission lines are unknown and can vary greatly from line to line. Some lines may be extremely short and have little resistance, while other lines may be extremely long and have an extremely large line resistance of on the order of several kohms. Additionally, the voltage of the generators cannot be known exactly. Accordingly, the use of parallel power converters of the prior art in order to aggregate DC power will cause excessive power loss on some transmission lines, and excessive current drain on other transmission lines, which in turn can result in excessive power loss. This behavior causes unregulated and oscillatory behavior at the outputs of the power converters.

Thus, a need presently exists for a method and apparatus for aggregating power and producing a single, regulated direct current voltage from multiple power sources having unknown characteristics.

SUMMARY

By way of introduction, the preferred embodiments below provide a method and apparatus for aggregating power from multiple sources. The apparatus generates a single direct current regulated voltage for powering a load. The apparatus is connected to a plurality of direct current power sources by a plurality of lines. Each direct current power source has an open circuit voltage. The open circuit voltage may be unknown, although the maximum open circuit voltage is known. Each line of the plurality of lines has a line resistance. The line resistance may be unknown. Furthermore, the line resistance may be large. Current is drawn from the power sources through the plurality of lines. The apparatus generates the single direct current regulated voltage from the drawn current. For each line, the current drawn is limited such that a closed circuit voltage corresponding to a voltage across the line while drawing the current is at least one half of the open circuit voltage. The current may be further limited such as to limit the maximum power drawn from each power source. The apparatus comprises a master pulse width modulator circuit and a plurality of slave voltage converters. The master pulse width modulator circuit produces a master pulse width modulated signal. Each slave voltage converter of the plurality of slave voltage converters is connected to a line of the plurality of lines. Each slave voltage converter receives the master pulse width modulated signal. Each slave voltage converter is operative to modify the master pulse width modulated signal such as to maintain the voltage relationship between the open circuit voltage and the closed circuit voltage, and to limit the maximum power drained from the power source connected to the slave voltage converter. Each slave voltage converter uses the master pulse width modulated signal to switch the drawn current through a power stage. The power stage produces an output voltage. Many different power stages may be implemented. The output voltages of all of the plurality of slave voltage converters are conjoined to form the single direct current regulated voltage.

The foregoing paragraph has been provided by way of general introduction, and it should not be used to narrow the scope of the following claims. The preferred embodiments will now be described with reference to the attached drawings.

DETAILED DESCRIPTION OF THE PRESENTLY PREFERRED EMBODIMENTS

In the figures described in the specification, the same reference characters refer to the same parts throughout the specification and drawings.

Figure 1:
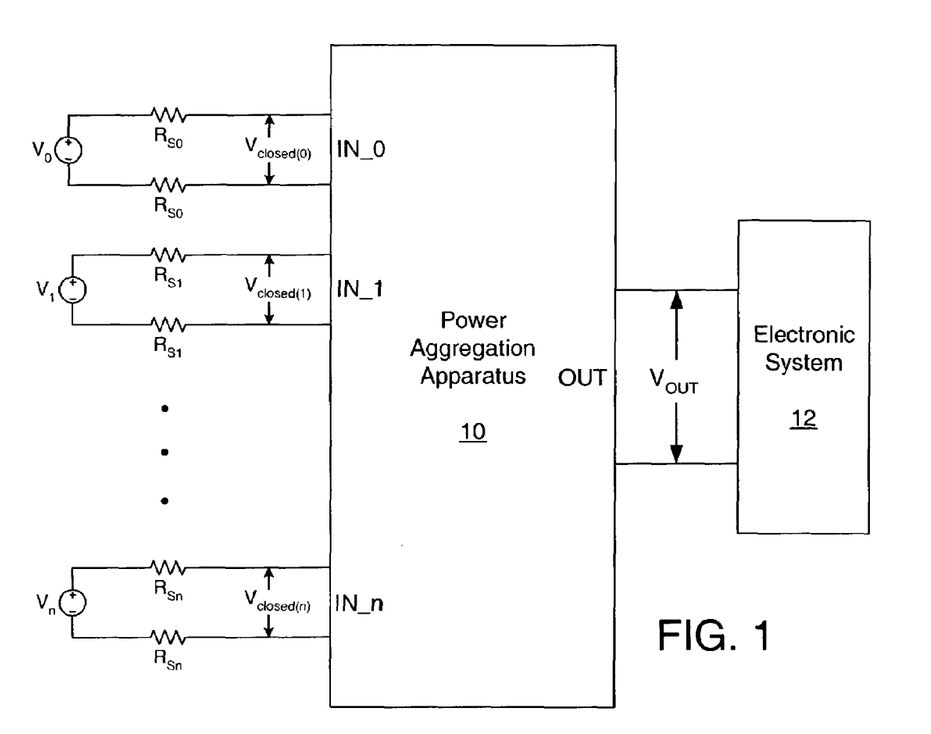
FIG. 1 is a power aggregation apparatus connected to a plurality of direct current power sources and to an electronic system.

Referring to FIG. 1, a power aggregation apparatus 10 is shown. The power aggregation apparatus 10 comprises a plurality of inputs, IN_0 through IN_n, and an output, OUT. The inputs are connected to a plurality of direct current power sources, $V_0$ through $V_n$, by a plurality of lines. Each line of the plurality of lines has a line resistance shown by the resistors $R_{S0}$ through $R_{Sn}$. The output, OUT, is connected to an electronic system 12. Briefly, the power aggregation apparatus 10 draws current from the power sources, through the lines, and generates a single direct current regulated voltage, $V_{out}$, on the output, OUT. The term "line" is understood to include a wire pair and therefore may be used interchangeably with the term "wire-pair."

The line resistance $R_{Sn}$ of at least some of the lines may be unknown. Furthermore, the line resistance of at least some of the lines is large. An example of a large line resistance is a 5 kohm line resistance, resulting in a total loop resistance of around 10 kohms. Another example of a large line resistance is a line resistance wherein a non-negligible portion of the power drawn from the power source, for example more than a few percent, is dissipated in the line. Additionally, an open circuit voltage, that is the voltage directly across the power source indicated by the labels $V_0$ through $V_n$, may not be known for at least some of the power sources. In one embodiment, while the open circuit voltage is not known, the minimum and maximum open circuit voltages of each power source are known. For example, in one specification the minimum open circuit voltage is 160 volts, and the maximum open circuit voltage is 200 volts.

A closed circuit voltage, $V_{closed(0)}$ through $V_{closed(n)}$, varies according to the current flowing from the power source, through the line, to the power aggregation apparatus 10. For example as current flow increases through a line the closed circuit voltage $V_{closed(n)}$ decreases. Also, since the line resistance of each line can vary from line to line, the closed circuit voltage for each line can vary greatly even when equal current is drawn through each line.

The lines may comprise lines such as lines of the PSTN, plain old telephone system (POTS) lines, twisted pair conductors, and xDSL lines. xDSL lines may include high bit-rate digital subscriber line (HDSL) lines such as high bit-rate digital subscriber line 2 (HDSL2) lines and high bit-rate digital subscriber line 4 (HDSL4) lines, as well as asymmetric digital subscriber line (ADSL) lines, symmetric digital subscriber line (SDSL) lines, and very high bit-rate digital subscriber line (VDSL) lines. While some telecom standards do not currently allow power to be fed down some types of lines, this is a limitation of the telecom standard and not of the power aggregation apparatus. The power aggregation apparatus may be implemented for use with multiple wire pairs of essentially any type, with each wire pair having its own power source. In particular, according to the specification for HDSL power, the open circuit voltage V may vary from 160 volts to 200 volts. A minimum closed circuit voltage for HDSL power is set to around 110 volts, which is greater than one half of the maximum open circuit voltage. Additionally, the HDSL specification limits the power drawn from an HDSL2 pair to 15 watts, For a 2-pair HDSL4 the power limit is 25 watts total, or 12.5 watts per wire pair.

Figure 2:
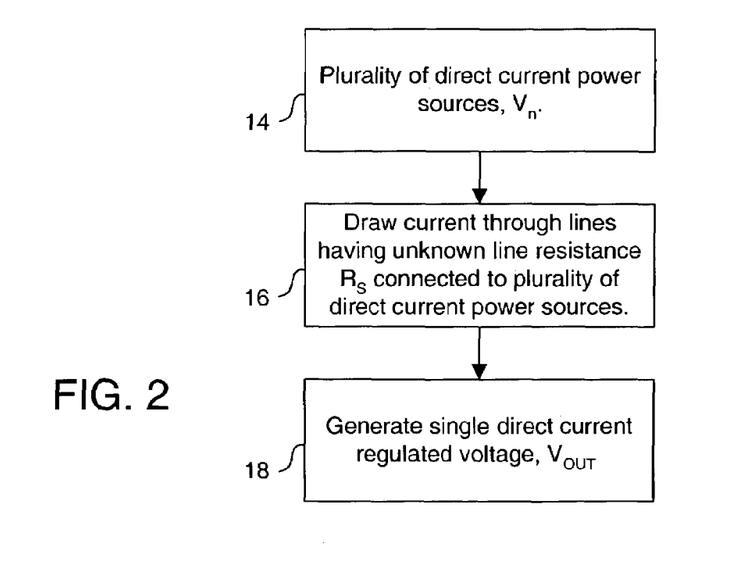
FIG. 2 is a method for aggregating power from multiple sources.

FIG. 2 shows a method for aggregating power from multiple sources. The method is implemented by power aggregation circuitry of the power aggregation apparatus 10. A plurality of direct current power sources, $V_n$, such as those described above, are provided (step 14). Current is drawn through a plurality of lines (step 16) connected to the direct current power sources. At least some of the lines may have an unknown line resistance, $R_S$, such as described above. Furthermore, at least some of the lines have a large line resistance. Also, the open circuit voltage of at least some of the direct current power sources may be unknown, although the maximum open circuit voltages are known.

In drawing the current, for each line, the amount of current drawn is limited such that the closed circuit voltage is at least one half of the maximum open circuit voltage. Additionally, the amount of current drawn is further limited according to other specifications. For example, for an HDSL2 line, the maximum open circuit voltage is 200 volts. Additionally, as mentioned above, no more than 15 watts should be drawn from an HDSL2 source according to the specification. Therefore, the amount of current drawn through the line is limited in the case of HDSL2 to a maximum of 15 W/200V or 75 mA. In one embodiment, the current is limited to around 67 mA to provide an additional buffer against component tolerances. By limiting the current in such a manner, no more than 15 watts will be pulled from an HDSL2 source. In many circumstances much less than 15 watts will be drawn since the open circuit voltage may be less than 200 volts and the line resistance $R_S$ can cause the closed circuit voltage $V_{closed(n)}$ to decrease to 100 volts, or one half of the maximum open circuit voltage, before the maximum current is drawn. If the line resistance $R_S$ is very small then the maximum of 15 watts may be drawn from the voltage source without causing an excessively low closed circuit voltage.

The voltage limit is set such that $V_{closed}(n)$ is at least one half of the open circuit voltage because maximum power transfer occurs between the power source and the power aggregation apparatus when that voltage relationship is satisfied. Drawing additional current beyond what causes $V_{closed}(n)$ to be at least one half of the open circuit voltage yields negative returns, whereby an increasing amount of power is dissipated in the line rather than delivered to the power aggregation apparatus and hence to the load. In one embodiment the closed circuit voltage, $V_{closed}(n)$, is allowed to decrease to 110 volts, which is always greater than one half of the maximum open circuit voltage of 200 volts. The 10 volt margin allows for component tolerances, and, due to the nonlinear nature of the power versus current relationship, does not significantly reduce the power capability of the power aggregation apparatus. For HDSL4 the power limit is set to 12.5 watts for each wire pair of the two wire pair.

Referring back to FIG. 2, a single direct current regulated voltage is generated from the drawn current (step 18). In one embodiment the direct current regulated voltage $V_{OUT}$ is 12 volts and the maximum power available to be delivered to the electronic system 12 connected to the power aggregation apparatus 10 is nominally the sum of the power drawn through the plurality of lines, minus power dissipated by the power aggregation apparatus 10.

In generating the single direct current regulated voltage the drawn current is switched using a pulse width modulated signal. Specifically, for each line, the current is switched according to a pulse width modulated signal formed from a master pulse width modulated signal, as will be described below. For each line, the switching produces an isolated pulse width modulated voltage. The isolated pulse width modulated voltage is rectified and filtered to form a direct current voltage for each line. The direct current voltage for each line is conjoined with the direct current voltage of all of the other lines, thereby forming a single direct current regulated voltage.

The duty cycle of the master pulse width modulated signal varies according to the single direct current regulated voltage. For example, if the single direct current regulated voltage decreases then the duty cycle of the master pulse width modulated signal increases. The duty cycle of the master pulse width modulated signal may be sufficiently large such that maximum current, and in some cases, more than maximum current would be drawn from at least some of the lines if the master pulse width modulated signal was used directly to control the switching of the drawn current. In one embodiment, the range of the duty cycle is from around 5% to around 50%.

Circuitry connected to each line receives the master pulse width modulated signal. The master pulse width modulated signal controls the switching of the drawn current. If, for each line, either the current limit or voltage limit is exceeded as describe above, the master pulse width modulated signal is modified, by reducing or limiting the pulse width of the master pulse width modulated signal such that the current limit or voltage limit is no longer exceeded. Briefly, by limiting the pulse width of the master pulse width modulated signal, less current is drawn from the line and optimal power transmission characteristics can be maintained for each line. If both the current limit and the voltage limit are not exceeded, the pulse width of the master pulse width modulated signal is not limited by the circuitry connected to each line.

Figure 3:
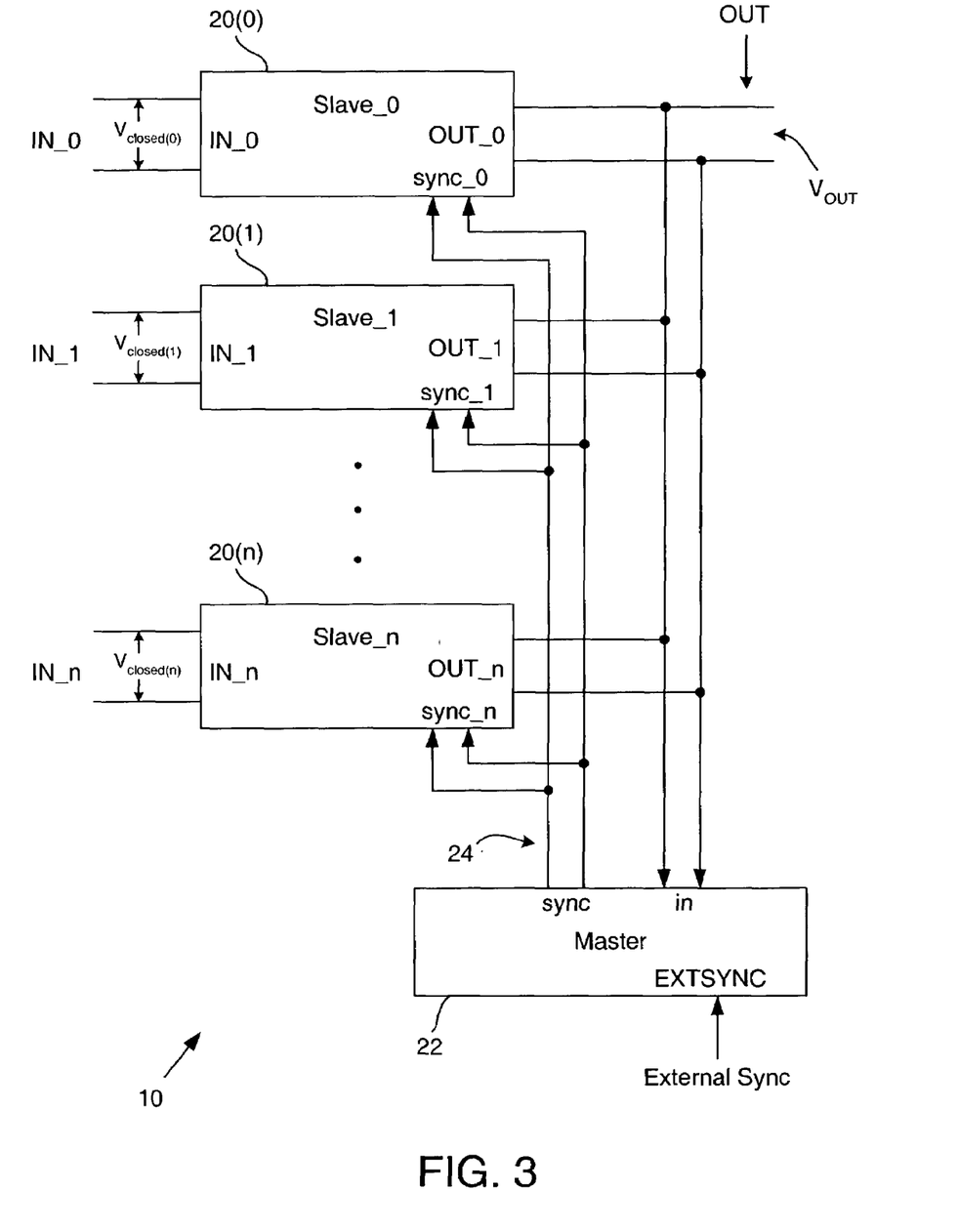
FIG. 3 is a detailed view of the power aggregation apparatus.

FIG. 3 shows a detailed view of the power aggregation apparatus 10 that implements the method described above. The power aggregation apparatus 10 comprises a plurality of slave voltage converters 20(0) through 20(n), and master pulse width modulator controller circuitry 22. Each slave voltage converter 20(0) through 20(n) comprises an input voltage port, IN_n, an output voltage port, OUT_n, and a sync input, sync_n. The input voltage port IN_n of each slave voltage converter is connected to a line, which in turn is connected to a power source. The output voltage ports OUT_n of all of the slave voltage converters 20(0) through 20(n) are conjoined to form the output OUT of the power aggregation apparatus 10. The slave voltage converters 20(0) through 20(n) are identical and it is understood that any reference made to one slave voltage converter applies equally to all of the slave voltage converters. Accordingly, the reference 20(n) by itself is meant to include any one of the plurality of slave voltage converters.

The master pulse width modulator controller circuitry 22 comprises an input which is connected to the conjoined output voltage ports OUT, and further comprises a sync output labeled sync. The sync output is in turn connected to the sync input sync_n of each of the plurality of slave voltage converters 20(0) through 20(n). Briefly, with reference to FIG. 2 and the method described above, current is drawn into each slave voltage converter and the single direct current regulated voltage $V_{OUT}$ is generated. The master pulse width modulator circuitry 22, receives power from $V_{OUT}$ and forms the master pulse width modulated signal 24, which is modified as needed by each slave voltage converter 20(0) through 20(n) to control the switching of the drawn current and generate their voltage outputs OUT_0 though OUT_n.

Figure 4:
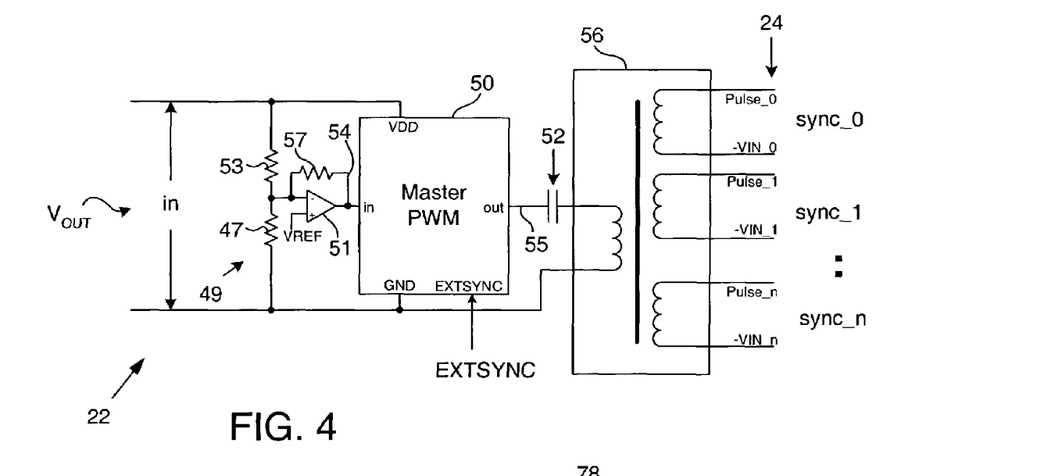
FIG. 4 is an embodiment of a master pulse width modulator circuit of the power aggregation apparatus.

FIG. 4 shows one embodiment of the master pulse width modulator controller circuitry 22. The master pulse width modulator controller circuitry 22 comprises a master pulse width modulator 50 having an input and an output, an error amplifier circuit 49, a capacitor 52 connected to the output of the master pulse width modulator 50, and an isolation device 56 connected to capacitor 52. The input, in, of the master pulse width modulator circuitry 22 is connected to the master pulse width modulator 50 and the error amplifier circuit 49. The master pulse width modulator 50 and the error amplifier circuit 49 therefore receive the single direct current regulated voltage $V_{OUT}$. $V_{OUT}$ provides power to the master pulse width modulator 50 across VDD and GND, and the error amplifier circuit 49 provides a signal 54 that is dependent on the voltage $V_{OUT}$.

The error amplifier circuit 49 comprises an impedance 53 connected to a resistance 47 connected to the inverting input of an amplifier 51. A feedback impedance 57 is connected between the inverting input and the output of the amplifier 51. The non-inverting input is connected to a voltage reference VREF. In one embodiment VREF is supplied by the master PWM through a voltage divider.

The master pulse width modulator 50 outputs a pulse width modulated signal 55 that has a duty cycle which varies in proportion to the signal 54. The pulse width modulated signal 55 is fed through the capacitor 52 to the isolation device 56. Capacitor 52 removes the DC component of the signal 55 to prevent saturation of the isolation device 56, which, for example, is a transformer. Other isolation devices may be used, such as an optical isolator, in which case capacitor 52 is not needed and signal 55 may be connected directly to the isolation device 56. The isolation device 56 outputs a plurality of identical sync outputs 24, sync_0 through sync_n which supply a master pulse width modulated signal to the slave converters as described above. The master pulse width modulator circuitry 22 may also include an external sync input EXTSYNC into the master pulse width modulator 50. The external sync may be used to synchronize the master pulse width modulator 50 to an external clock.

Many different pulse width modulators may be employed for the master pulse width modulator 50. One such pulse width modulator is an Advanced Voltage Mode Pulse Width Modulator part number UCC25702 from Texas Instruments Inc., the operation of which is well understood by those having ordinary skill in the art. The isolation device 56 may be a transformer such as a pulse transformer. One such pulse transformer is part number VPH1-1400 from Coiltronics. Other types of transformers may be used. Other isolation devices, such as optical isolators may also be used Furthermore, multiple transformers or other isolation devices may be used in parallel to supply more sync outputs than is possible with a single transformer. The error amplifier circuit 49 is comprised of resistors, capacitors, and an operational amplifier such as Maxim part number MAX4321.

Figure 5:
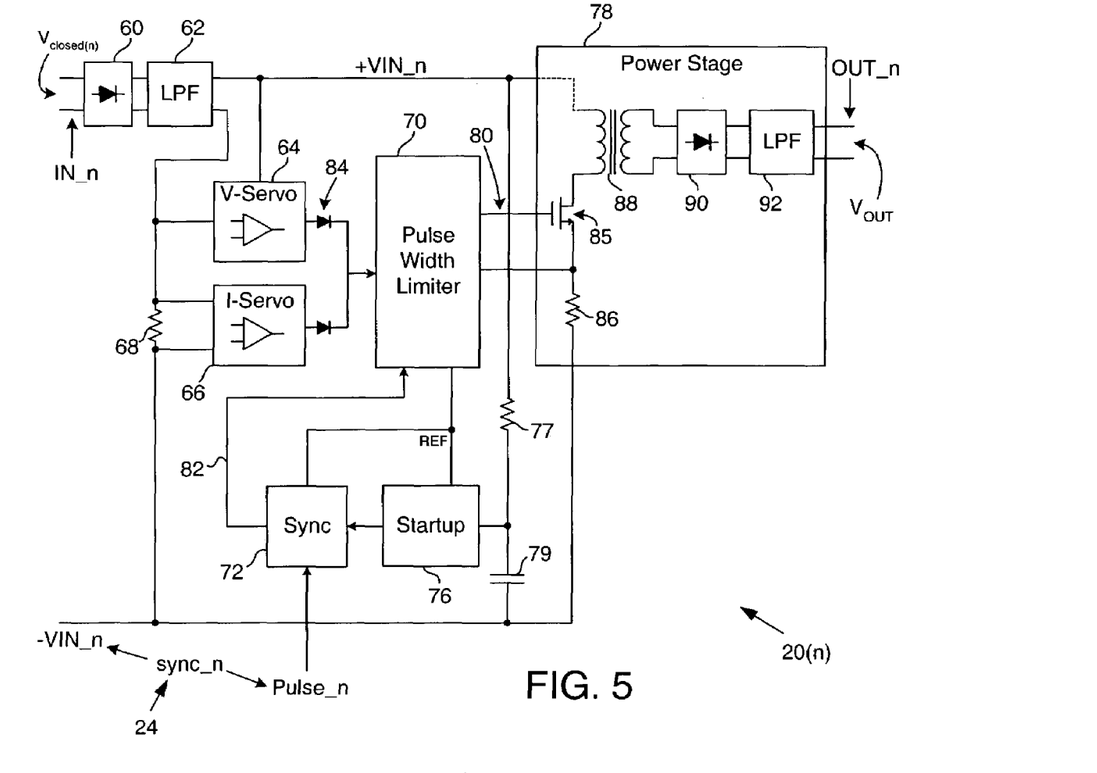
FIG. 5 is an embodiment of a slave voltage converter of the power aggregation apparatus.

FIG. 5 shows one embodiment of the slave voltage converter 20(n) of the power aggregation apparatus 10. The slave voltage converter 20(n) comprises an input rectifier 60, a low pass filter 62, a v-servo circuit 64, an i-servo circuit 66 including a current sensing resistor 68, a pulse width limiter 70, a-sync circuit 72, a startup circuit 76 including a startup resistor 77 and a startup capacitor 79, and a power stage 78. The pulse width limiter 70, the a-sync circuit 72 and the startup circuit 76 may be integrated into a single integrated device.

The input rectifier 60 rectifies an input voltage on input port IN_n. Although the input voltage is a direct current voltage there exists the possibility of polarity reversal. The rectifier 60 ensures that the correct polarity will be applied to the low pass filter 62. The filter 62 filters the rectified input voltage to produce a filtered input voltage +VIN_n. In one embodiment the filter 62 is a low pass filter comprising resistors, capacitors, and inductors and having a cutoff frequency of 2.55 kHz and a two-pole filter response.

Since the master pulse width modulator circuit 22 is powered by the output voltage $V_{OUT}$ from the slave voltage converters 20(0) through 20(n), a startup circuit 76 initiates operation when power is applied to the input port IN_n of any slave voltage converter. When power is initially applied to input port IN_n of the slave converter 20(n) a voltage appears between +VIN_n and −VIN_n. The startup resistor 77 connected to +VIN_n provides a current to the startup capacitor 79, connected between the startup resistor 77 and −VIN_n. Startup circuit 76 senses the capacitor voltage and when sufficient voltage is sensed causes the sync circuit 72 and pulse width limiter 70 to produce an oscillator signal at pulse width limiter output 80. The pulse width limiter output 80 is connected to the power stage 78. The power stage 78 produces the output voltage $V_{OUT}$, which appears on the output voltage port OUT_n of the slave voltage converter. In one embodiment the output voltage is around 12 volts and the oscillator signal on pulse width limiter output 80 is free-running at around 260 kHz. The output voltage $V_{OUT}$ causes the master pulse width modulator controller circuitry 22 to produce the master pulse width modulator output 24.

After the startup operation described above, the master pulse width modulator signal 24 from the master pulse width modulator circuit 22 is received by the sync circuit 72 as signal Pulse_n shown in FIGS. 4 and 5. The master pulse width modulator signal 24 is higher in frequency than the slave's oscillator signal. Following the startup operation, the pulse width limiter output 80 is of the same frequency as the master pulse width modulator signal 24. In one embodiment the master pulse width modulator signal 24 is around 285 kHz. The sync circuit 72 provides the master pulse width modulator signal 24 to the pulse width limiter as shown by the arrow labeled 82. In another embodiment the master pulse width modulator signal 24 is initially 285 kHz and then, after an external sync is supplied to the master pulse width modulator circuit 22, is 312.5 kHz.

The pulse width limiter 70 limits the pulse width of the master pulse width modulator signal 82 received from the sync circuit 72. The pulse width is limited according to outputs from the v-servo circuit 64 and the i-servo circuit 66. The v-servo circuit 64 ensures that the voltage relationship described above between the open circuit voltage and the closed circuit voltage is maintained such that the closed circuit voltage is at least one half of the open circuit voltage. The i-servo circuit 66 ensures that the power drawn from the power source is not exceeded. For example, as discussed above, the maximum power that can be drawn from an HDSL2 wire pair is 15 watts.

The v-servo circuit 64 compares the filtered input voltage +VIN_n with a reference voltage and outputs a v-servo voltage. The i-servo circuit 66 senses the current, via the current sensing resistor 68 drawn through the line connected to the slave 20(n) and outputs an i-servo voltage. The v-servo voltage and the i-servo voltage are conveyed to the pulse width limiter 70 through diodes 84 as shown in FIG. 5. In such a configuration, the higher voltage of the v-servo and i-servo voltages will cause the pulse width limiter 70 to limit the pulse width, thereby ensuring that neither the voltage limit nor the current limit is ever exceeded.

In one embodiment the v-servo circuit and the i-servo circuit are each comprised of an operational amplifier, resistors, and capacitors, and the current sensing resistor may be a 10 ohm resistor. In one embodiment, the operation amplifier is an LMC6462 operation amplifier from National Semiconductor. In one embodiment, the pulse width limiter 70, the sync circuit 72, and the startup circuit 76 is a single integrated device. One exemplary device is an Advanced Voltage Mode Pulse Width Modulator part number UCC25701 from Texas Instruments. In one embodiment utilizing the UCC25701, the "ILIM" pin of the UCC25701 receives the v-servo and i-servo voltages through diodes 84, such as 1N4148W diodes, and through a resistor divider. The master pulse width modulated signal, pulse_n is received on the "SYNC" pin after being inverted and level shifted. The limited pulse width modulated output signal is provided by the UCC25701 on the "OUT" pin. The startup resistor 77 and capacitor 79 are connected to the "VDD" pin and the FB pin. The UCC25701 also provides a 5.0 volt reference voltage used by the v-servo circuit for the voltage comparison and by the i-servo circuit for the current comparison.

The power stage 78 receives the pulse width limited signal 80 and produces the output voltage $V_{OUT}$ on output voltage port OUT_n. The power stage 78 comprises a power MOSFET 85, a resistor 86, a transformer 88, a rectifier 90, and a low pass filter 92. Power stages are well understood by those of ordinary skill in the art and many power stage topologies may be used. In one embodiment the power stage 78 comprises a forward converter. Other types of power stages include a flyback converter, a cuk converter, a single-ended-primary-inductance converter, a center-tapped push-pull converter, a full-bridge converter, and a half-bridge converter. Many other power stage topologies can be used.

Figure 6:
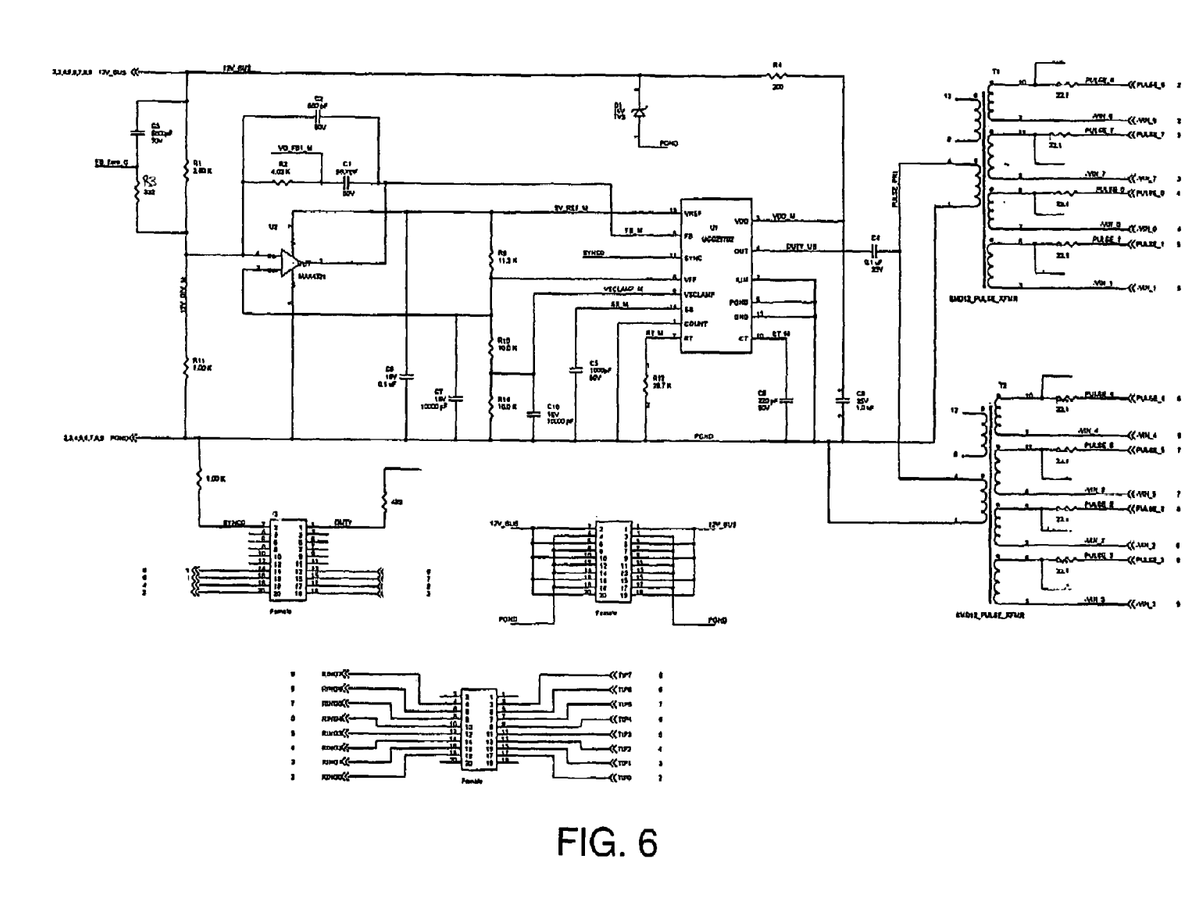
FIG. 6 is a detailed schematic diagram of the master pulse width modulator circuit.

FIG. 6 is a detailed schematic diagram of the master pulse width modulator circuit 22. With reference to FIGS. 6 and 4, U1 (UCC25702) is the master PWM 50. R1 (2.8 kohm), C3 (6800 pF), and R3 (332 ohm) comprise the impedance 53, and R11 (1.00 kohm) is resistance 47. U2 (MAX4321) is amplifier 51 with the feedback impedance 57 comprising C1 (5600 pF), C2 (560 pF), and R2 (4.02 kohm). Output 54 is from U2 is connected to the FB pin of U1. The non-inverting input of U2 is connected to a voltage divider comprising resistors R9 (11.3 kohm), R10 (10 kohm), and R14 (10 kohm) which produces 3.2 volts on the non-inverting input of U2 from 5 volt reference output on the VREF pin of U1. Power is supplied to U2 from VREF of U1. The OUT pin of U1 supplies pulse width modulated signal 55 into capacitor 52 which is C4 (0.1 µF). An external sync input may be supplied to the SYNC pin of U1. Two identical isolation devices 56 are shown as T1 (SMD12_PULSE_XFMR) and T2 (SMD12_PULSE_XFMR), to provide eight identical pulse outputs 24, PULSE_0 through PULSE_7. Components C6, C7, C10, C5, R12, C8, C9, R4, and D1 are for providing voltage stability and voltage level for proper operation of U1 and the master pulse width modulator circuit as would be known by those of ordinary skill in the art.

Figure 7:
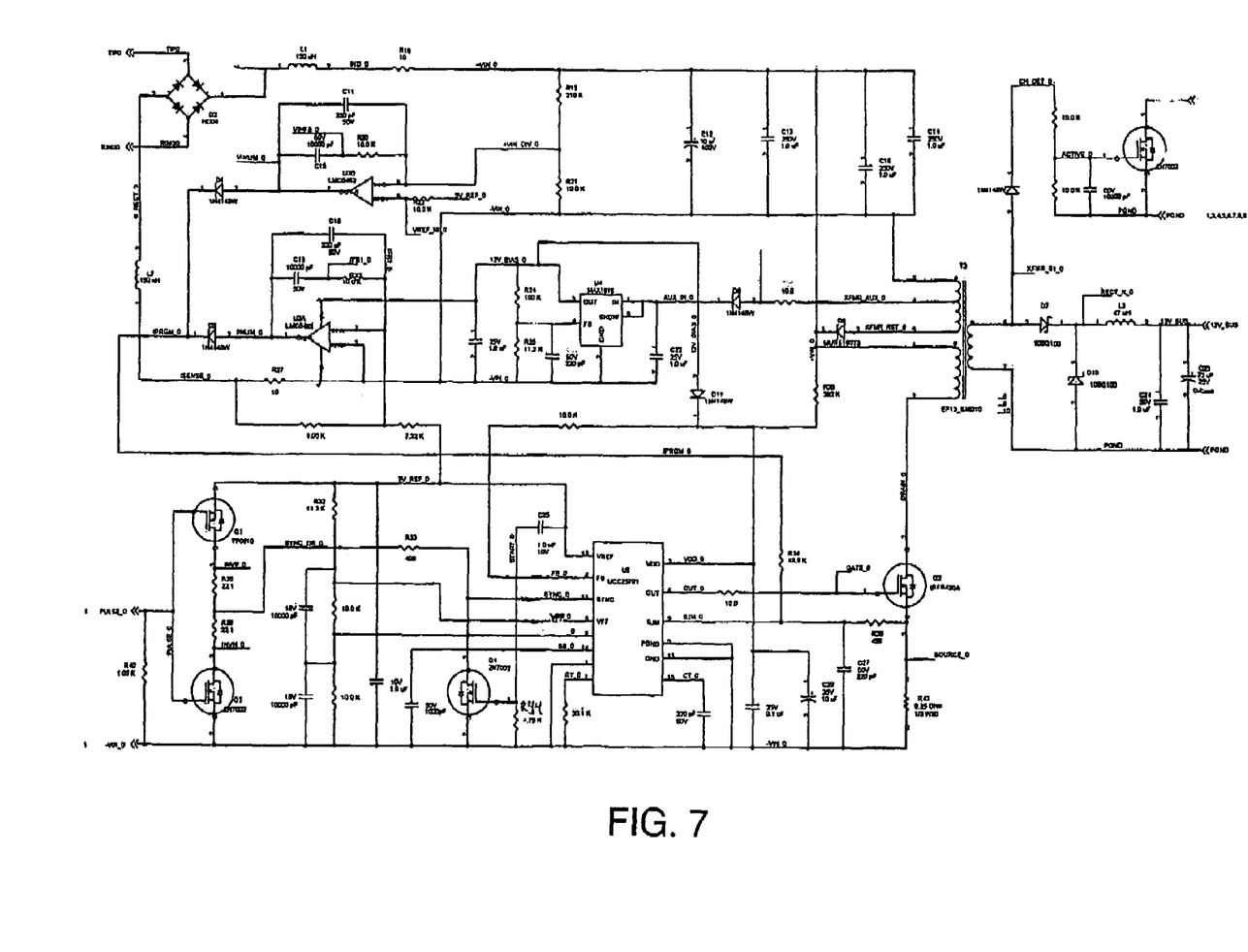
FIG. 7 is a detailed schematic diagram of the slave voltage converter.

FIG. 7 is a detailed schematic diagram of the slave voltage converter. With reference to FIGS. 7 and 5, D2 (HD04) is rectifier 60. Low pass filter 62 is comprised of L1 (150 µH), L2 (150 µH), R18 (10 ohm), C12 (10 µF), C13 (10 µF), C16 (1.0), and C14 (1.0 µF). The v-servo circuit 64 is comprised of U3B (LMC6462), C11 (220 pF), C15 (10000 pF), and R20 (10 kohm). The v-servo circuit compares the voltage from the voltage divider comprised of R19 (210 kohm) and R21 (10 kohm) with a 5 volt reference voltage 5V_REF_0 through resistor R22 (10 kohm). The i-servo circuit 66 comprises U3A (LMC6462), C18 (220 pF), C19 (10000 pF), R23 (10 kohm), and senses current on resistor R27 (10 ohm, 68 of FIG. 5). Diodes 84 are D4 (IN4148W) and D9 (1N4148) and their outputs are connected to pulse width modulator U5 (UCC25701) pin ILIM through resistor R34 (49.9 kohm) connected to capacitor C27 (200 pF).

Startup resistor 77 is R28 (392 kohm) and capacitor 79 is C32 (0.1 µF) and C29 (10 µF). The sync circuit 72 comprises transistors Q1 (TP0610), Q3 (2N7002), and Q4 (2N7002), R35 (22.1 ohm), R39 (22.1 ohm), R33 (499 ohm), C25 (1.0 µF), and R44 (4.75 kohm). Q1 and Q3 form an inverter and level shifter for inverting and providing a proper bias for the pulse signal PULSE_0 into the SYNC input of U5. Q4 with C25 and R44 tie the SYNC input low for a short period of time (defined by the values of C25 and R44) when power is initially supplied to allow U5 to produce the oscillator output discussed above and to allow time for the master pulse width modulator circuitry to begin generating its signals, after which Q4 is open and the pulse signals are received on the SYNC input of U5.

The power stage 78 comprised of transistor Q2 (IRFR420A, 85 of FIG. 5), R42 (0.25 ohm, 86 of FIG. 5), transformer T3 (EP13,SMD10, 88 of FIG. 5), rectifier 90 comprised of diodes D7 (10BQ100) and D10 (10BQ100), and low pass filter 92 comprises of L3 (47 µH), C24 (1.01 µF), and C23 (22 µF).

A linear voltage regulator U4 (MAX1616) generates a 12 volt voltage 12V_BIAS_0 for powering U3B and U3A, as well as U5 through D11 (1N4148W) after startup. U4 receives input power by rectifying and filtering the signals from transformer T3 with D6 (1N4184W) and C22 (1.0 µF). U5 is powered by the filtered input voltage +VIN_0 and therefore begins generating signals as soon as power is supplied across TIP0 and RING0 of rectifier D2. U5 also provides a 5 volt reference voltage on pin VREF.

With the master pulse width modulator circuit of FIG. 6 and the slave voltage converter of FIG. 7, the power aggregation apparatus comprises eight inputs and eight slave voltage converters. Each of the eight inputs may be connected to an HDSL2 line or one half of an HDSL4 line. One aspect of the slave voltage converter of FIG. 7 is that power is consumed by only those slaves that are connected to a line. That is, if the input for the slave remains unconnected, that slave does not consume any power, except for negligible power dissipated by parasitic effects of Q1 and Q3, and by resistor R40 (1.00 kohm). Additional slaves can therefore be added to the power aggregation apparatus for providing support for additional lines, even if those lines are not yet available, with no negative effects.

The foregoing detailed description has described a method and apparatus for aggregating power from multiple power sources. The power sources may have unknown characteristics. The apparatus generates a single direct current regulated voltage from current drawn from the power sources. Alternative embodiments of the present invention are possible. For example, the master pulse width modulator circuit can receive input from the primary side of any one of the slave voltage converters, rather than from the secondary side of all of the slave voltage converters. In a different example, rather than using the master pulse width modulator signal at each slave voltage converter, a master controller produces a current command voltage. The current command voltage is transferred across an isolation boundary to each slave power converter using optical isolation or other isolation means. All of the slave power converters then supply an equal share of load current to the load. In another embodiment a digital master control circuit produces current command signals for each slave power converter. Each slave power converter uses its respective current command signal to control how much current to draw from the line.

The foregoing detailed description has discussed only a few of the many forms that this invention can take. It is intended that the foregoing detailed description be understood as an illustration of selected forms that the invention can take and not as a definition of the invention. It is only the following claims, including all equivalents, that are intended to define the scope of this invention.

What is claimed is:

1. A method for aggregating power from multiple sources comprising:
  (a) providing a plurality of direct current power sources;
  (b) drawing current through a plurality of lines connected to the plurality of direct current power sources, wherein the current drawn in each of said plurality of lines is performed by switching the current in response to a modified pulse width modulated (PWM) signal, wherein each modified PWM signal is a modified form of a master PWM signal, the modified PWM signal being generated by limiting a pulse width of the master PWM signal such that a closed circuit voltage corresponding to a voltage across the line while drawing the current is at least one half of an open circuit voltage corresponding to a voltage across the direct current power source from which the current is drawn; and (c) generating a single direct current regulated voltage from the current drawn in (b).

2. The invention of claim 1 wherein the maximum open circuit voltage is 200 volts.

3. The invention of claim 1 wherein the power drawn from each direct current power source of the plurality of direct current power sources is up to 15 watts.

4. The invention of claim 1 wherein the power drawn from each direct current power source of the plurality of direct current power sources is up to 12.5 watts.

5. The invention of claim 1 wherein the single direct current regulated voltage is 12 volts.

6. The invention of claim 1 wherein at least some of the lines have a total line resistance of at least 1 kohms.

7. The invention of claim 1 wherein the plurality of lines comprise xDSL lines.

8. The invention of claim 7 wherein the xDSL lines are HDSL2 lines.

9. The invention of claim 7 wherein the xDSL lines are HDSL4 lines.

10. The invention of claim 1, wherein the switching performed in response to the modified pulse width modulated signal comprises, for each line, limiting a pulse width of the master pulse width modulated signal such that the power drawn from each direct current power source of the plurality of direct current power sources is up to 15 watts.

11. The invention of claim 1, wherein the switching performed in response to the modified pulse width modulated signal comprises, for each line, limiting a pulse width of the master pulse width modulated signal such that the power drawn from each direct current power source of the plurality of direct current power sources is up to 12.5 watts.

12. The invention of claim 1, wherein said switching comprises forming a master pulse width modulated signal, wherein said forming comprises adjusting a duty cycle of the master pulse width modulated signal according to the single direct current regulated voltage.

13. The invention of claim 1 further comprising rectifying and filtering the current drawn in (b) that is switched.

14. An apparatus for aggregating power from multiple sources comprising circuitry that implements the method of claim 1.

15. An apparatus for aggregating power from multiple sources, the apparatus connected to a plurality of direct current power sources by a plurality of lines, wherein each direct current power source of the plurality of direct current power sources has an open circuit voltage, wherein the open circuit voltage is unknown, wherein a maximum value of the open circuit voltage is known, wherein each line of the plurality of lines has a line resistance, the apparatus comprising:

power aggregation circuitry connected to the plurality of lines;

wherein said power aggregation circuitry draws current through the plurality of lines from the plurality of direct current power sources;

wherein said power aggregation circuitry limits the current drawn through the plurality of lines such that, for each line of the plurality of lines, a closed circuit voltage corresponding to a voltage across the line while drawing current is at least one half of the maximum open circuit voltage;

wherein said power aggregation circuitry generates a single direct current regulated voltage from the drawn current; and wherein said power aggregation circuitry comprises a master pulse width modulator circuit for producing a master pulse width modulator signal, wherein the current drawn in each of said plurality of lines is performed by switching the current in response to a modified pulse width modulated (PWM) signal, wherein each modified PWM signal is a modified form of a master PWM signal, the modified PWM signal being generated by limiting a pulse width of the master pulse width modulated signal such that a closed circuit voltage corresponding to a voltage across the line while drawing the current is at least one half of an open circuit voltage corresponding to a voltage across the direct current power source from which the current is drawn.

16. The invention of claim 15 wherein said power aggregation circuitry comprises: a master pulse width modulator circuit for producing a master pulse width modulator signal; and a plurality of slave voltage converters wherein each slave voltage converter of said plurality of slave voltage converters is connected to a line of the plurality of lines, wherein each slave voltage converter receives said master pulse width modulator signal, wherein each slave voltage converter is operative to modify said master pulse width modulator signal according to a voltage comparison and a current measurement, wherein said master pulse width modulator signal is used to switch the drawn current from the line through a power stage of said slave voltage converter.

17. The invention of claim 16 wherein a duty cycle of said master pulse width modulator signal varies according to the single direct current regulated voltage.

18. The invention of claim 16 wherein said power stage comprises one of the following converters: a forward converter, a flyback converter, a cuk converter, a single-ended-primary-inductance converter, a center-tapped push-pull converter, a full-bridge converter, a half-bridge converter.

19. The invention of claim 16 wherein each slave voltage converter of said plurality of slave voltage converters is operative to modify said master pulse width modulator signal such that the power drawn from each direct current power source of the plurality of direct current power sources is up to around 15 watts.

20. The invention of claim 16 wherein each slave voltage converter of said plurality of slave voltage converters is operative to modify said master pulse width modulator signal such that the power drawn from each direct current power source of the plurality of direct current power sources is up to around 12.5 watts.

21. The invention of claim 16 wherein each slave voltage converter of said plurality of slave voltage converters comprises startup circuitry for initiating a startup operation of said slave voltage converter.

22. The invention of claim 15 wherein said single direct current regulated voltage is 12 volts.

23. An apparatus for aggregating power from multiple sources and generating a single direct current regulated voltage, the apparatus connected to a plurality of direct current power sources by a plurality of lines, wherein each direct current power source of the plurality of direct current power sources has an open circuit voltage, wherein the open circuit voltage is unknown, wherein a maximum value of the open circuit voltage is known, wherein each line of the plurality of lines has a line resistance, wherein the line resistance of at least some of the plurality of lines is large, the apparatus comprising:

a plurality of slave voltage converters wherein each slave voltage converter of said plurality of slave voltage converters comprises an input voltage port, an output voltage port, and a sync input, wherein said input voltage port of each slave voltage converter is connected to a line of the plurality of lines, wherein all output voltage ports of said plurality of slave voltage converters are conjoined; and a master pulse width modulator circuit comprising a master pulse width modulator circuit input and a master pulse width modulator circuit output, said master pulse width modulator circuit input connected to said output voltage port that is conjoined, said master pulse width modulator circuit output connected to said sync input of each slave voltage converter of said plurality of slave voltage converters.

24. The invention of claim 23 wherein said master pulse width modulator circuit further comprises an external sync input.

25. The invention of claim 23 wherein said master pulse width modulator circuit comprises:
a master pulse width modulator comprising an input and an output;
an error amplifier circuit connected to said output voltage port that is conjoined and to said input of said master pulse width modulator;
a capacitor connected to said output of said master pulse width modulator; and
an isolation device connected to said capacitor, and to said master pulse width modulator circuit output.

26. The invention of claim 23 wherein each slave voltage converter of said plurality of slave voltage converters comprises:
an input rectifier connected to said input voltage port;
a filter connected to said input rectifier for producing a filtered input voltage;
a v-servo circuit for comparing the filtered input voltage to a reference voltage;
an i-servo circuit including a resistor for sensing a current threshold on said input voltage port;
a pulse width limiter connected to said v-servo circuit and said i-servo circuit for producing a pulse width limiter output signal;
a sync circuit connected to said pulse width limiter, and to said master pulse width modulator circuit output;
a startup circuit connected to said sync circuit;
a startup resistor connected to said filter;
a startup capacitor connected to said startup resistor; and
a power stage connected to said pulse width limiter;
wherein said startup circuit receives a startup signal from said startup resistor and said startup capacitor, wherein said startup signal causes said startup circuit, said sync circuit, and said pulse width limiter to produce an oscillator signal, wherein said oscillator signal is received by said power stage, wherein said power stage produces an output voltage, wherein said output voltage causes said master pulse width modulator circuit to output a master pulse width modulator signal, wherein said master pulse width modulator signal is received by said sync circuit;
wherein said sync circuit provides said master pulse width modulator signal to said pulse width limiter;
wherein said pulse width limiter limits a pulse width of said master pulse width modulator signal according to a signal provided by said v-servo circuit and said i-servo circuit; and
wherein said power stage produces an output voltage on said output voltage port by switching and filtering said filtered input voltage according to said pulse width limiter output signal.

27. The invention of claim 26 wherein said power stage is a power stage selected from the group of power stages consisting of a forward converter, a flyback converter, a cuk converter, a single-ended-primary-inductance converter, a center-tapped push-pull converter, a full-bridge converter, and a half-bridge converter.

28. The invention of claim 26 wherein said pulse width limiter, said sync circuit, and said startup circuit is a single integrated device.

29. The invention of claim 23 wherein said master pulse width modulator circuit further comprises an external sync input.

30. An apparatus for aggregating power from multiple sources and generating a single direct current regulated voltage, the apparatus connected to a plurality of direct current power sources by a plurality of lines, wherein each direct current power source of the plurality of direct current power sources has an open circuit voltage, wherein the open circuit voltage is unknown, wherein a maximum value of the open circuit voltage is known, wherein each line of the plurality of lines has a line resistance, wherein the line resistance of at least some of the plurality of lines is large, the apparatus comprising:

a plurality of slave voltage converters wherein each slave voltage converter of said plurality of slave voltage converters comprises:
rectifier means connected to a line of the plurality of lines for rectifying the open circuit voltage;
filter means connected to the rectifier means for producing a filtered voltage;
startup means for producing a startup signal from said filtered voltage;
pulse width modulator means for producing a pulse width modulator output;
sync means connected to said pulse width modulator means for causing said pulse width modulator means to initiate a startup cycle according to said startup signal, and for supplying a master pulse width modulated output signal to said pulse width modulator means after said startup cycle;
power stage means for producing a direct current voltage according to said pulse width modulator output by switching said filtered voltage;
i-servo means for causing said pulse width modulator means to modify said pulse width modulator output;
v-servo means for causing said pulse width modulator means to modify said pulse width modulator output; and
linear regulator means for providing power to said i-servo means and said v-servo means;
a master pulse width modulator circuit connected to said plurality of slave voltage converters, said master pulse width modulator circuit comprising:
error amplifier means for producing an error signal proportional to the single direct current regulated voltage;
master pulse width modulator means for receiving said error signal and producing said master pulse width modulated output signal; and isolation means for isolating said master pulse width modulated output signal.

* * * * *